United States Patent
Butzmann

(10) Patent No.: US 9,065,154 B2
(45) Date of Patent: Jun. 23, 2015

(54) SERIES CONNECTION OF SWITCHING REGULATORS FOR ENERGY TRANSFER IN BATTERY SYSTEMS

(75) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 826 days.

(21) Appl. No.: 13/384,826

(22) PCT Filed: Jun. 24, 2010

(86) PCT No.: PCT/EP2010/058976
§ 371 (c)(1),
(2), (4) Date: Jun. 4, 2012

(87) PCT Pub. No.: WO2011/009691
PCT Pub. Date: Jan. 27, 2011

(65) Prior Publication Data
US 2012/0228931 A1   Sep. 13, 2012

(30) Foreign Application Priority Data
Jul. 20, 2009 (DE) .................. 10 2009 027 833

(51) Int. Cl.
| H02J 1/00 | (2006.01) |
| H01M 6/42 | (2006.01) |
| H01M 10/44 | (2006.01) |
| H01M 10/42 | (2006.01) |
| H02J 7/00 | (2006.01) |

(52) U.S. Cl.
CPC .............. *H01M 10/441* (2013.01); *H01M 6/42* (2013.01); *H01M 10/425* (2013.01); *H02J 7/0013* (2013.01); *H02J 7/0065* (2013.01)

(58) Field of Classification Search
CPC ......... H02J 1/00; H02J 7/0013; H02J 7/0065; H02M 6/42; H02M 10/425; H02M 10/441
USPC ............................................................ 307/82
See application file for complete search history.

(56) References Cited

U.S. PATENT DOCUMENTS

| 6,489,753 B1 | 12/2002 | Patterson |
| 8,115,446 B2 * | 2/2012 | Piccard et al. ................. 320/104 |
| 2005/0017682 A1 | 1/2005 | Canter et al. |

(Continued)

FOREIGN PATENT DOCUMENTS

| EP | 1107418 A2 | 6/2001 |
| JP | 2002-218667 A | 8/2002 |

(Continued)

OTHER PUBLICATIONS

International Search Report corresponding to PCT Application No. PCT/EP2010/058976, mailed Sep. 30, 2010 (German and English language document) (5 pages).

*Primary Examiner* — Hal Kaplan
(74) *Attorney, Agent, or Firm* — Maginot, Moore & Beck LLP

(57) ABSTRACT

An energy transformer for a battery system is disclosed. The energy transformer includes a first and a second primary DC/DC converter each having two inputs and two outputs. The inputs are designed for connecting a battery module and the first and the second primary DC/DC converters are connected in series on the output side. The energy transformer has at least one first secondary DC/DC converter having two inputs that are connected to the outputs of the second primary DC/DC converter and a first output connected to one of the outputs of the first primary DC/DC converter.

10 Claims, 5 Drawing Sheets

(56) References Cited

U.S. PATENT DOCUMENTS

2008/0042493 A1    2/2008   Jacobs
2008/0185994 A1    8/2008   Altemose

FOREIGN PATENT DOCUMENTS

JP     2005-312249 A    11/2005
WO    2004/049540 A2    6/2004

* cited by examiner

SERIES CONNECTION OF SWITCHING REGULATORS FOR ENERGY TRANSFER IN BATTERY SYSTEMS

This application is a 35 U.S.C. §371 National Stage Application of PCT/EP2010/058976, filed on Jun. 24, 2010, which claims the benefit of priority to Ser. No. DE 10 2009 027 833.8, filed on Jul. 20, 2009 in Germany, the disclosures of which are incorporated herein by reference in their entirety.

BACKGROUND

There is an increasing demand for battery systems which are intended to be used in stationary applications such as wind power installations and standby power supply systems, or else in vehicles. All of these applications place stringent requirements on reliability and failsafety. The reason for this is that complete failure of the voltage supply through the battery system can lead to a failure of the entire system. For example, in wind power installations, batteries are used in order to adjust the rotor blades when the wind is strong and to protect the installation against excessive mechanical loads which could damage or even destroy the wind power installation. If the battery in an electric car were to fail, the car would become undrivable. A standby power supply system is in turn intended precisely to ensure interruption-free operation, for example of a hospital, and therefore cannot itself fail, as far as possible.

In order to make it possible to provide the power and energy required for the respective application, individual battery cells are connected in series, and in some cases additionally in parallel. FIG. 1 shows an outline circuit diagram of batteries connected in series. A multiplicity of battery cells 10-1 to 10-n are connected in series in order to achieve the high operating voltage, as required for the electric motor in a passenger car, for example, by addition of the voltages of the individual cells 10-1, ..., 10-n. The high operating voltage can be decoupled by output-side switches 11-1 and 11-2 from the downstream power-electronic components, such as inverters, which are not illustrated. Since the total output current of the battery flows in each of the battery cells 10-1, ..., 10-n because the battery cells 10-1, 10-n are connected in series, with the charge transport taking place by electrochemical processes within the battery cells 10-1, ..., 10-n, the failure of a single battery cell means, in the extreme, that the entire arrangement can no longer provide any current and therefore any electrical energy. In order to allow a threat of failure of a battery cell 10-1, ..., 10-n to be identified in good time, a so-called battery management system 12 is normally used, which is or can be connected to both terminals of each of the battery cells 10-1, ..., 10-n and determines operating parameters such as the voltage and temperature of each battery cell 10-1, ..., 10-n and, therefrom, their state of charge (SoC) at regular or selectable intervals. This means a high level of complexity with at the same time little flexibility for the electrical operating data of the battery system.

Further disadvantages of connecting a multiplicity of battery cells in series are as follows:

1. Conditions are imposed for the operating voltage to be provided, the maximum current and the stored energy for various operating states of the device to be operated using the battery, which conditions can be combined only when a greater number of battery cells are coupled than would actually be necessary to comply with the individual requirements. This increases the price, as well as the weight and volume of the battery system, which are particularly disruptive in the case of an electric car.

2. The installation of the battery, that is to say the interconnection of the individual cells, is performed at high voltages up to 1000 V, because the voltages of the individual battery cells are added by being connected in series, as a result of which the battery, individual cells or modules cannot be replaced in local workshops or, in the case of stationary use, can only be replaced using a special tool by a specially trained skilled workman. This results in a high degree of complexity in terms of logistics for maintenance of battery systems in the event of a fault.

3. In order to connect the battery system to be free of voltage, that is to say to disconnect the actual battery from the load, circuit breakers 11-1 and 11-2 need to be provided, which are typically in the form of contactors, and are very expensive for the high currents and voltages to be expected.

SUMMARY

The invention is based on the object of introducing an apparatus which makes it possible to overcome the above-mentioned disadvantages of the prior art.

A first aspect of the disclosure relates to an energy transmitter for a battery system, the energy transmitter comprising a first and a second primary DC/DC converter, each having two inputs and two outputs, the inputs being designed for connection of a battery module, and the first and second primary DC/DC converters being connected in series on the output side. According to the disclosure, the energy transmitter has at least one first secondary DC/DC converter with two inputs, which are connected to the outlets of the second primary DC/DC converter, and with a first output, which is connected to one of the outputs of the first primary DC/DC converter.

The disclosure has the advantage that the primary DC/DC converters connected in series on the output side generate a selectable output voltage, which is independent of the voltage and therefore of the state of charge of the battery modules, it being possible for the battery modules which are connected to the first and second primary DC/DC converters to be loaded to different extents. This is made possible by the first secondary DC/DC converter, whose inputs are connected to the outputs of the second primary DC/DC converter, and which draws energy from the second primary DC/DC converter on activation of the first secondary DC/DC converter and transmits energy via the first output, which is connected to an output of the first primary DC/DC converter. As a result, the first primary DC/DC converter and the battery module connected thereto on the input side are relieved of load. In this way, the disclosure allows so-called load balancing, for example, in which the state of charge of each battery module is intended to be equal, as far as possible, with the result that no battery cell is discharged below a critical value, although other battery cells could still have more energy available.

The use of DC/DC converters makes it possible, in addition, to select a total voltage which is suitable depending on the operating situation, since the output voltage of the individual DC/DC converters can be adjusted in a known manner. In addition, the output voltage becomes independent of the number of battery cells connected on the primary side. As a result, the battery system can be designed purely on the basis of energy and power criteria, irrespective of the total voltage required for the respective application. A further advantage consists in that the expensive contactors 11-1 and 11-2 can be dispensed with because the high voltage at the battery output can be disconnected in a simple manner by disconnecting the DC/DC converters.

The energy transmitter preferably has a second secondary DC/DC converter with two inputs, which are connected to the outputs of the first primary DC/DC converter. The second secondary DC/DC converter in this case has a first output, which is connected to one of the outputs of the second primary DC/DC converter. The second secondary DC/DC converter is in this case designed to draw energy from the first primary DC/DC converter and to transmit energy to the second primary DC/DC converter. As a result, it is possible to provide compensation, not only by transmission of energy from the second to the first primary DC/DC converter, but also to transmit energy in the opposite direction from the first primary DC/DC converter to the second primary DC/DC converter. It goes without saying that a greater number of primary DC/DC converters can also be connected in series, with a secondary DC/DC converter being connected to the output of each primary DC/DC converter.

Particularly preferably, the energy transmitter has a third primary DC/DC converter with two inputs, which are designed for connection of a battery module, and two outputs. The third primary DC/DC converter is connected in series with the first and second primary DC/DC converters on the output side in such a way that the second primary DC/DC converter is connected directly to the first and the third primary DC/DC converters, i.e. the second primary DC/DC converter is arranged centrally in the series circuit. The first secondary DC/DC converter has a second output, which is connected to an output of the third primary DC/DC converter. The first secondary DC/DC converter is therefore capable of drawing energy from the second primary DC/DC converter and transmitting this energy either via the first output to the first primary DC/DC converter or via the second output to the third primary DC/DC converter. In the case of a series circuit comprising an even higher number of primary DC/DC converters, a corresponding number of secondary DC/DC converters can be provided, which can each transmit energy to one of the primary DC/DC converters adjacent on either side. As a result, a particularly high degree of flexibility in terms of the distribution of energy and therefore in terms of the loading of the various battery modules is achieved. If, for example, energy is drawn from a primary DC/DC converter by the associated secondary DC/DC converter and transmitted to the adjacent primary DC/DC converter, the secondary DC/DC converter connected to the adjacent primary DC/DC converter can transmit this energy on directly to the next primary DC/DC converter. Preferably, the uppermost and lowermost primary DC/DC converters in the series circuit (in the example with the first, second and third primary DC/DC converters the first and third primary DC/DC converters) are also connected to secondary DC/DC converters, but these only have either the first or the second output since the uppermost and lowermost primary DC/DC converters have only one adjacent primary DC/DC converter.

In terms of circuitry, the first secondary DC/DC converter can be designed to draw energy from the second primary DC/DC converter and to transmit energy to the first primary DC/DC converter in a discharge mode of the energy transmitter for discharging the battery modules and to the third primary DC/DC converter in a charge mode of the energy transmitter for charging the battery modules. As a result, the choice as to which output of the first secondary DC/DC converter is used to transmit the energy drawn from the second primary DC/DC converter is affected by the operating mode of the energy transmitter. If energy is being drawn from the battery modules, for example if a motor vehicle equipped with a corresponding energy transmitter is being accelerated, the energy is output to the first primary DC/DC converter, and if it is intended for the motor vehicle to be braked and for the braking energy to be fed back to the battery modules via a generator, the energy is output to the third primary DC/DC converter.

Preferably, the first secondary DC/DC converter has a coil, a first switch and a first diode. The coil and the first switch are connected in series between the inputs of the first secondary DC/DC converter, and the diode is connected between a node between the coil and the first switch and the first output of the first secondary DC/DC converter.

In a preferred variant of the first secondary DC/DC converter with a first and a second output, the first secondary DC/DC converter also has a second switch and a second diode, the second switch being connected in series with the first switch and the coil between the inputs of the first secondary DC/DC converter in such a way that the coil is connected between the first and second switches. The second diode is connected between a node between the coil and a second switch and the second output of the first secondary DC/DC converter.

Each primary DC/DC converter can have a control input for a control signal and be designed to electrically connect the outputs of the primary DC/DC converter to one another and to electrically decouple at least one of the inputs of the primary DC/DC converter, for reception of the control signal. This embodiment makes it possible to switch off a primary DC/DC converter selectively during operation, for example because a battery cell of the battery module connected on the input side is defective. By virtue of the connection of the outputs of the primary DC/DC converter, an output current can continue to flow in the entire arrangement. In order not to subject the battery module to any further load, said battery module is also decoupled. This embodiment therefore provides the possibility of continuous operation of the apparatus despite the failure of one or more battery cells. In addition, it is possible, if appropriate, to replace a battery module during running operation, without the generation of the total voltage needing to be interrupted.

A second aspect of the disclosure introduces a battery system with an energy transmitter in accordance with the first aspect of the disclosure and a plurality of battery modules. The battery modules each have at least one battery cell. The battery terminals of the battery modules are detachably connected to a corresponding input of the first and second inputs of a DC/DC converter of the energy transmitter.

A third aspect of the disclosure relates to a motor vehicle with an energy transmitter in accordance with the first aspect of the disclosure.

BRIEF DESCRIPTION OF THE DRAWINGS

The disclosure will be explained in more detail below with reference to figures relating to exemplary embodiments. In the figures.

DETAILED DESCRIPTION

Figure 1:
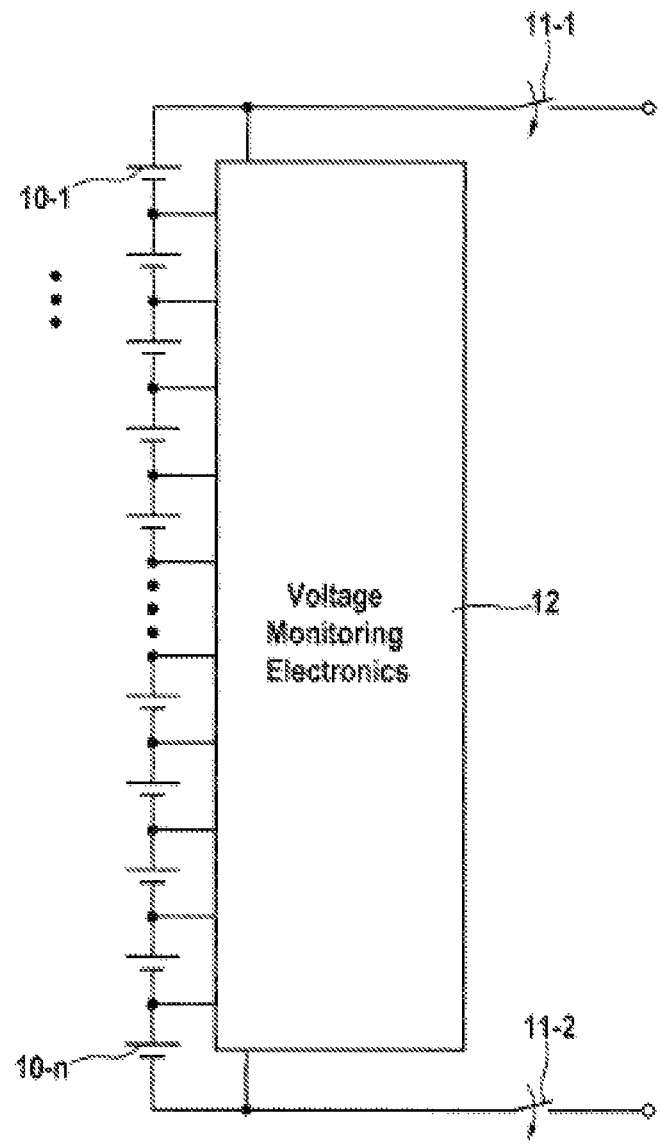
FIG. 1 shows a battery with a battery management system in accordance with the prior art.
Figure 2:
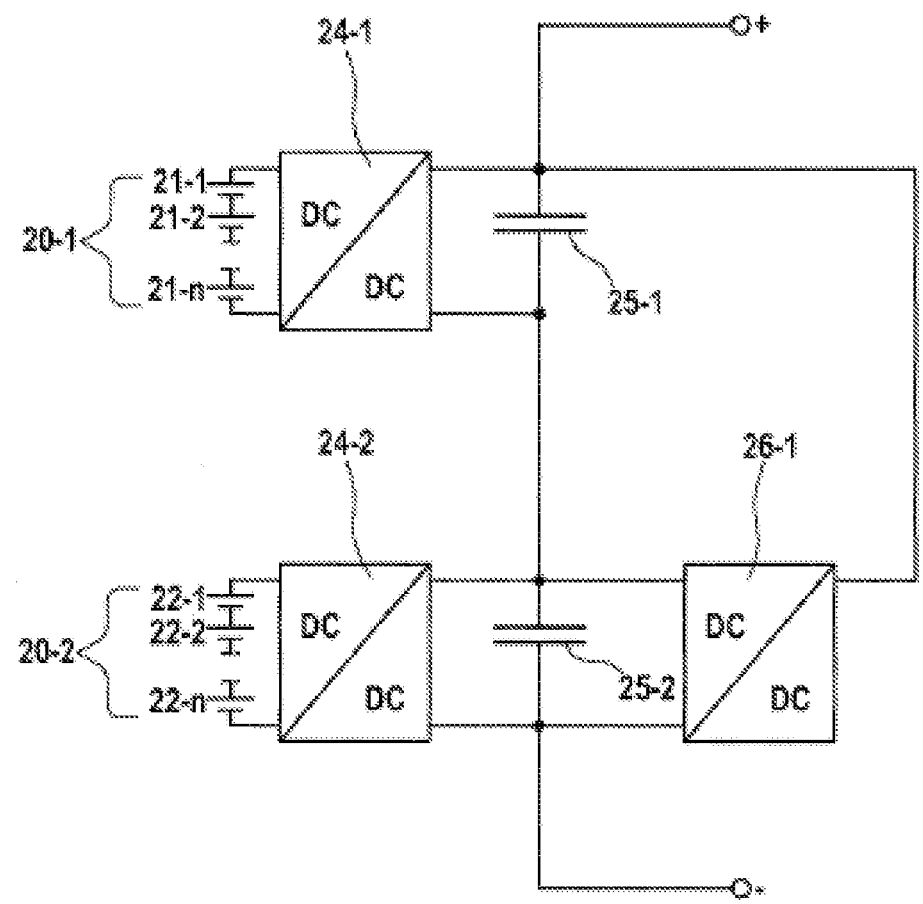
FIG. 2 shows a first variant of a first exemplary embodiment of the disclosure.

FIG. 2 shows a first variant of a first exemplary embodiment of the disclosure. Two battery modules 20-1 and 20-2 each having a plurality of battery cells 21-1 to 21-n and 22-1 to 22-n, respectively, are each connected to the inputs of a primary DC/DC converter 24-1 and 24-2, respectively. The primary DC/DC converters 24-1, 24-2 can have a known design and can generate an output voltage which is independent of the voltage of the battery modules 20-1, 20-2 and can also be greater than said voltage. Preferably, the primary DC/DC converters in this case have internal feedback in order to be able to precisely monitor the output voltage. The outputs of the primary DC/DC converters 24-1, 24-2 are each connected to a buffer capacitor 25-1 and 25-2, respectively, which smoothes the output voltage of the respective primary DC/DC converter 24-1, 24-2 and acts as a short-term energy store. The primary DC/DC converters 24-1, 24-2 are connected in series on the output side, the uppermost primary DC/DC converter 24-1 being connected to a positive output of the arrangement, and the lowermost primary DC/DC converter 24-2 being connected to a negative output of the arrangement. The first variant shown of the first exemplary embodiment has a secondary DC/DC converter 26-1, whose inputs are connected to the outputs of the primary DC/DC converter 24-2 and therefore to the two terminals of the buffer capacitor 25-2. The secondary DC/DC converter 26-1 is designed to draw energy from the primary DC/DC converter 24-2 on activation and to transmit this energy, via a first output, to the output of the primary DC/DC converter 24-1, with the result that said primary DC/DC converter is relieved of load. The primary DC/DC converter 24-1 therefore needs to draw less energy from the battery module 20-1 connected on the input side in order to keep its output voltage stable. As a result, on activation of the secondary DC/DC converter 26-1, the battery module 20-1 can be relieved of load and the battery module 20-2 can be loaded to a greater extent, which can be used to compensate for different states of charge of the battery modules. It is also possible in principle to disconnect the primary DC/DC converter 24-1 for a short period of time and to allow its function to be taken on by the secondary DC/DC converter 26-1.

Figure 3:
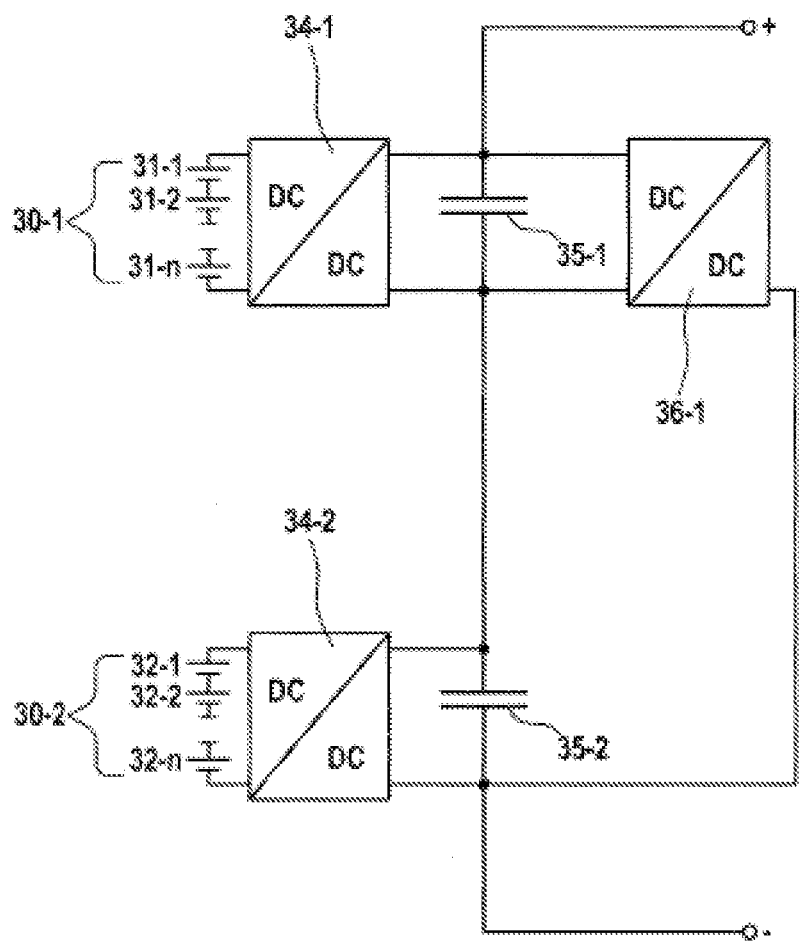
FIG. 3 shows a second variant of the first exemplary embodiment of the disclosure.

FIG. 3 shows a second variant of the first exemplary embodiment of the disclosure. The second variant of the first exemplary embodiment largely corresponds to the first variant, with the result that that which has been said in relation to the first variant applies correspondingly to the second variant as well. The only substantial difference in relation to the first variant consists in that the secondary DC/DC converter 36-1 is not connected on the input side to the lowermost primary DC/DC converter 34-2, but to the uppermost primary DC/DC converter 34-1. The secondary DC/DC converter also does not have a first output, but only one second output, which is connected to an output of the primary DC/DC converter 34-2. The second variant provides the possibility of transmission of energy from the first primary DC/DC converter 34-1 to the second primary DC/DC converter 34-2, with the result that, in the second variant of the first exemplary embodiment, the second primary DC/DC converter 34-2 is relieved of load and the first primary DC/DC converter 34-1 is loaded to a greater extent. A combination of the first and second variants of the first exemplary embodiment is of course also possible, with the result that two secondary DC/DC converters are used and energy can optionally be transmitted from and to each of the primary DC/DC converters.

Figure 4:
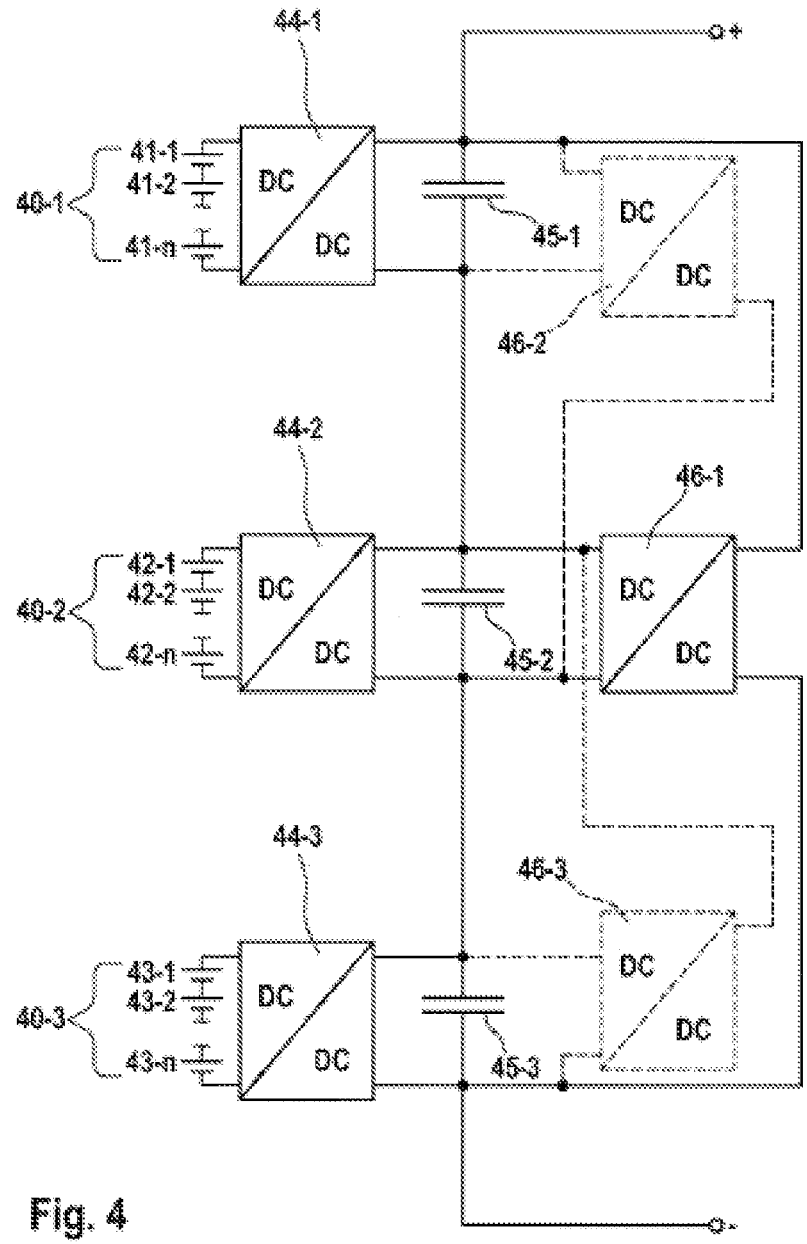
FIG. 4 shows a second embodiment of the disclosure.

FIG. 4 shows a second exemplary embodiment of the disclosure. The exemplary embodiment shown has three primary DC/DC converters 44-1 to 44-3, which are each connected on the input side to a battery module 40-1 to 40-3. Each of the battery modules 40-1 to 40-3 has one or more battery cells 41-1 to 41-n, 42-1 to 42-n and 43-1 to 43-n, respectively. The outputs of the primary DC/DC converters 44-1 to 44-3 are each connected to a buffer capacitor 45-1 to 45-3 and are connected in series. A first secondary DC/DC converter 46-1 is connected on the input side to the outputs of the second primary DC/DC converter 44-2 and draws energy from said second primary DC/DC converter on activation. The first secondary DC/DC converter 46-1 has two outputs, of which one is connected to an output of the upper adjacent primary DC/DC converter 44-1 and the other is connected to an output of the lower adjacent primary DC/DC converter 44-3. By corresponding control of the first secondary DC/DC converter 46-1, the energy drawn from the second primary DC/DC converter 44-2 can be supplied either to the upper primary DC/DC converter 44-1 or the lower primary DC/DC converter 44-3. It is also possible to supply energy alternately to the lower and the upper primary DC/DC converter 44-1 and 44-3, with the result that, on average, energy from the second primary DC/DC converter 44-2 is supplied to both adjacent primary DC/DC converters 44-1 and 44-3.

In order to increase the flexibility of the arrangement, further secondary DC/DC converters 46-2 and 46-3 can be provided (illustrated by dashed lines), whose inputs are connected to the outputs of the upper primary DC/DC converter 44-1 and the lower primary DC/DC converter 44-3, respectively. Since these two primary DC/DC converters 44-1 and 44-3 each only have one adjacent primary DC/DC converter, it is sufficient to equip the secondary DC/DC converters 46-2 and 46-3 with only either a first or a second output, with the result that the transmission of energy from the first primary DC/DC converter 44-1 to the second primary DC/DC converter 44-2 or from the third primary DC/DC converter 44-3 to the second primary DC/DC converter 44-2 is possible. Owing to this arrangement, energy can be transmitted from each of the primary DC/DC converters 44-1 to 44-3 to each other primary DC/DC converter 44-1 to 44-3, as desired, possibly via an intermediate station, for example by transmission of energy from the first primary DC/DC converter 44-1 to the second primary DC/DC converter 44-2 alongside simultaneous transmission of energy from the second primary DC/DC converter 44-2 to the third primary DC/DC converter 44-3. It goes without saying that it is also possible for the structure shown to be extended to a greater number of primary and secondary DC/DC converters.

Figure 5:
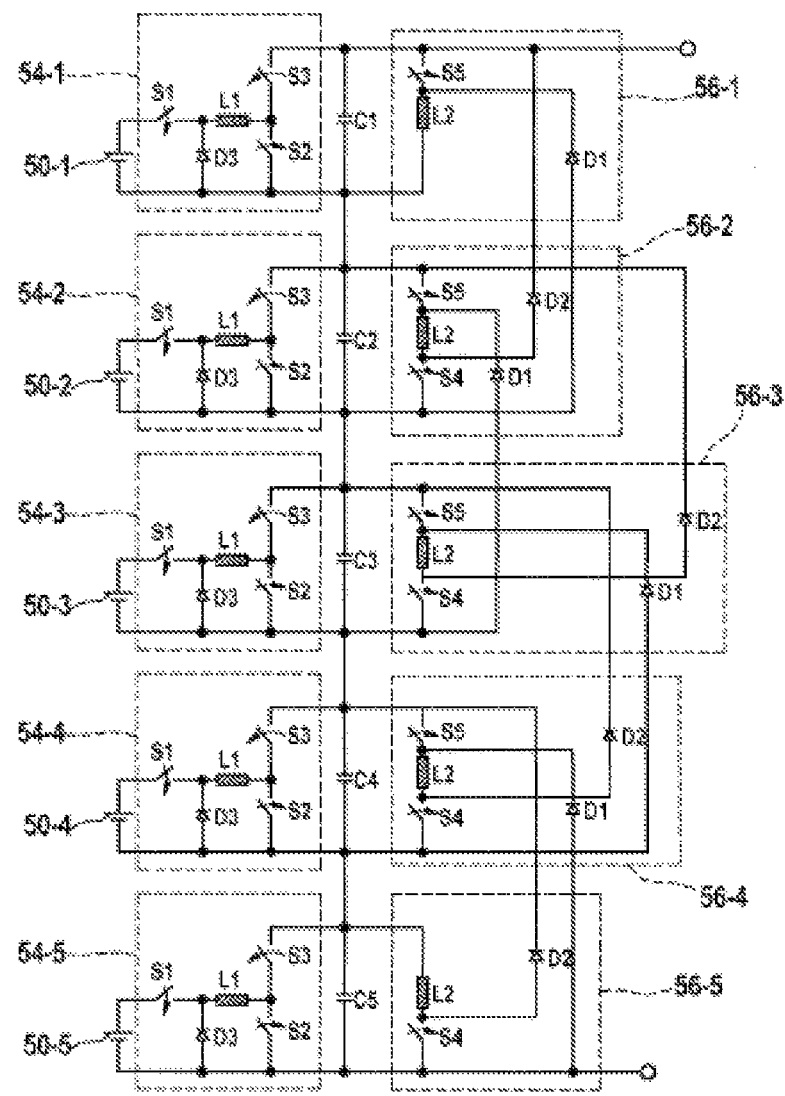
FIG. 5 shows a detailed circuit diagram of a third exemplary embodiment of the disclosure.

FIG. 5 shows a detailed circuit diagram of a third exemplary embodiment of the disclosure, in which in total five primary DC/DC converters 54-1 to 54-5 are connected in series on the output side. The primary DC/DC converters 54-1 to 54-5 are in the form of simple step-up/step-down converters with switches S2, S3, a coil L1 and a diode D3. However, numerous other known DC/DC converter structures are also conceivable. The primary DC/DC converters 54-1 to 54-5 each have an additional switch S1, which is designed to electrically decouple the battery module 50-1 to 50-5 which is respectively connected on the input side from the primary DC/DC converter 54-1 to 54-5 and therefore to deactivate said battery module. At the same time, the switches S2 and S3 can be closed, as a result of which the outputs of the respective primary DC/DC converter 54-1 to 54-5 are electrically conductively connected to one another, with the result that the respective primary DC/DC converter 54-1 to 54-5 is neutralized and deactivated without the function of the remaining primary DC/DC converters 54-1 to 54-5 being disrupted. As a continuation, it is possible to increase the output voltage of one or more of the remaining primary DC/DC converters 54-1 to 54-5 in order to keep the output voltage of the entire arrangement constant despite failure of the primary DC/DC converters 54-1 to 54-5.

Each of the primary DC/DC converters 54-1 to 54-5 is connected on the output side, as already previously demonstrated, to a buffer capacitor C1 to C5 in order to stabilize the output voltage of the respective primary DC/DC converter 54-1 to 54-5. In addition, in each case one secondary DC/DC converter 56-1 to 56-5 is associated with each of the primary DC/DC converters 54-1 to 54-5. In turn, the uppermost or the lowermost secondary DC/DC converter 56-1 or 56-5 has in each case only either a first or a second output since energy is intended to be transmitted only to an adjacent primary DC/DC converter 54-2 or 54-4. The central secondary DC/DC converters 56-2 to 56-4, on the other hand, each have a first and a second output, with the result that energy can be transmitted respectively to an upper and lower adjacent primary DC/DC converter 54-1 to 54-5. The secondary DC/DC converters 56-1 to 56-5 each have a coil L2 and a switch S4 or S5, which is connected in series with the coil between the inputs of the secondary DC/DC converter 56-1 to 56-5. The central DC/DC converters 56-2 to 56-4 additionally have a further switch, which is connected in series with the first switch and the coil L2 in such a way that the coil L2 is connected, at respective opposite ends, to one of the switches S4 and S5. The first and the second outputs of the secondary DC/DC converters 56-1 to 56-5 lead from in each case one associated node between the coil L2 and the first switch S4 or the second switch S5 via a diode D1 or D2 to either an output of the respective upper or lower adjacent primary DC/DC converter 54-1 to 54-5.

The diodes D1 and D2 are in this case connected such that, when energy is drawn from the entire arrangement, for example on acceleration of a motor vehicle equipped with the entire arrangement, energy can be transmitted via the first output and the first diode D1 in each case to the upper adjacent primary DC/DC converter 54-1 to 54-4 and in the event of a feedback or supply of energy to the battery modules 50-1 to 50-5, for example during braking or stationary charging of a motor vehicle equipped with the entire arrangement, energy can be transmitted via the second output and the second diode D2 in each case to the lower adjacent primary DC/DC converter 54-2 to 54-5.

The invention claimed is:

1. An energy transmitter for a battery system, the energy transmitter comprising:
   a first and a second primary DC/DC converter, each having two inputs and two outputs, the inputs being designed for connection of a battery module, and the first and second primary DC/DC converters being connected in series on the output side, and
   at least one first secondary DC/DC converter with two inputs, which are connected to the outputs of the second primary DC/DC converter, and with a first output, which is connected to one of the outputs of the first primary DC/DC converter.

2. The energy transmitter as claimed in claim 1, in which the first secondary DC/DC converter is designed to draw energy from the second primary DC/DC converter and to transmit energy to the first primary DC/DC converter.

3. The energy transmitter as claimed in claim 1, further comprising a second secondary DC/DC converter with two inputs, which are connected to the outputs of the first primary DC/DC converter, and with a first output which is connected to one of the outputs of the second primary DC/DC converter, the second secondary DC/DC converter being designed to draw energy from the first primary DC/DC converter.

4. The energy transmitter as claimed in claim 1, further comprising a third primary DC/DC converter two inputs designed for connection of a battery module and two outputs, the third primary DC/DC converter being connected in series with the first and second primary DC/DC converters on the output side in such a way that the second primary DC/DC converter is connected directly to the first and third primary DC/DC converters, and the first secondary DC/DC converter having a second output, which is connected to an output of the third primary DC/DC converter.

5. The energy transmitter as claimed in claim 4, in which the first secondary DC/DC converter is designed to draw energy from the second primary DC/DC converter and to transmit energy to the first primary DC/DC converter in a discharge mode of the energy transmitter for discharging the battery module and to the third primary DC/DC converter in a charge mode of the energy transmitter for charging the battery module.

6. The energy transmitter as claimed in claim 1, in which the first secondary DC/DC converter has a coil, a first switch, and a first diode, the coil and the first switch being connected in series between the inputs of the first secondary DC/DC converter, and the diode being connected between a node between the coil and the first switch and the first output of the first secondary DC/DC converter.

7. The energy transmitter as claimed in claim 6, in which the first secondary DC/DC converter also has a second switch and a second diode, the second switch being connected in series with the first switch and the coil between the inputs of the first secondary DC/DC converter in such a way that the coil is connected between the first and second switches, and the second diode being connected between a node between the coil and the second switch and the second output of the first secondary DC/DC converter.

8. The energy transmitter as claimed in claim 1, in which each primary DC/DC converter has a control input for a control signal and is designed to electrically connect the outputs of the primary DC/DC converter to one another and to electrically decouple at least one of the inputs of the primary DC/DC converter, for reception of the control signal.

9. A battery system, comprising:
   an energy transmitter; and
   a plurality of battery modules, which each have at least one battery cell and battery terminals,
   wherein the energy transmitter comprises a first and a second primary DC/DC converter, each having two inputs and two outputs, and the first and second primary DC/DC converters being connected in series on the output side, and at least one first secondary DC/DC converter with two inputs, which are connected to the outputs of the second primary DC/DC converter, and with a first output, which is connected to one of the outputs of the first primary DC/DC converter, and
   wherein the battery terminals are detachably connected to the inputs of one of the primary DC/DC converters of the energy transmitter.

10. A motor vehicle having an energy transmitter, the energy transmitter comprising:
   a first and a second primary DC/DC converter, each having two inputs and two outputs, the inputs being designed for connection of a battery module, and the first and second primary DC/DC converters being connected in series on the output side, and
   at least one first secondary DC/DC converter with two inputs, which are connected to the outputs of the second primary DC/DC converter, and with a first output, which is connected to one of the outputs of the first primary DC/DC converter.

* * * * *

UNITED STATES PATENT AND TRADEMARK OFFICE
CERTIFICATE OF CORRECTION

PATENT NO. : 9,065,154 B2
APPLICATION NO. : 13/384826
DATED : June 23, 2015
INVENTOR(S) : Stefan Butzmann It is certified that error appears in the above-identified patent and that said Letters Patent is hereby corrected as shown below:

In the Claims

Column 7, line 58 to column 8, line 7, which includes claims 3 and 4, should read:

3. The energy transmitter as claimed in claim 1, further comprising a second secondary DC/DC converter with two inputs, which are connected to the outputs of the first primary DC/DC converter, and with a first output which is connected to one of the outputs of the second primary DC/DC converter, the second secondary DC/DC converter being designed to draw energy from the first primary DC/DC converter and to transmit energy to the second primary DC/DC converter.
    4. The energy transmitter as claimed in claim 1, further comprising a third primary DC/DC converter with two inputs designed for connection of a battery module and two outputs, the third primary DC/DC converter being connected in series with the first and second primary DC/DC converters on the output side in such a way that the second primary DC/DC converter is connected directly to the first and third primary DC/DC converters, and the first secondary DC/DC converter having a second output, which is connected to an output of the third primary DC/DC converter.

Signed and Sealed this
Twenty-ninth Day of December, 2015

Michelle K. Lee
*Director of the United States Patent and Trademark Office*